United States Patent [19]
Butcher et al.

[11] Patent Number: 5,752,883
[45] Date of Patent: May 19, 1998

[54] METHOD AND SYSTEM FOR MANAGING ROLE PLAYING GAME INFORMATION

[75] Inventors: Donald R. Butcher, Carthage, Mo.; Christopher Wiseman, Joplin, Mo.; Michael E. Prater, Munci, Ind.

[73] Assignee: Triptic Mind, Inc., Carthage, Mo.

[21] Appl. No.: 690,201

[22] Filed: Jul. 25, 1996

[51] Int. Cl.$^6$ .................................................. A63F 9/24
[52] U.S. Cl. ................................................................. 463/43
[58] Field of Search .......................... 463/1, 7, 31, 36, 463/43, 44, 45; 395/118

[56] References Cited

U.S. PATENT DOCUMENTS

| | | | |
|---|---|---|---|
| 5,273,294 | 12/1993 | Amanai | 463/43 |
| 5,489,103 | 2/1996 | Okamoto | 463/43 |
| 5,649,862 | 7/1997 | Sakaguchi, et al. | 463/44 |

*Primary Examiner*—George Manuel
*Attorney, Agent, or Firm*—Miller, Cabfield, Paddock and Stone, P. L. C.

[57] ABSTRACT

A computer implemented method, system and article of manufacture allows role-playing fantasy game referees to present and manage information related to a role-playing game world. The presentation of role playing game information is accomplished by using at least two collections of data sets. The first collection of data sets define the graphical appearance of objects representing elements of a role playing world. The second collection of data sets define data associated with elements of a role playing world including a level of detail. The method includes the steps of displaying objects associated with a first level of detail, and receiving a user-generated input signal representing a selection of a displayed object. The method also includes the step of identifying the game information data associated with the selected object. Finally the method includes the step of presenting role-playing game information based on the identified game information data.

21 Claims, 12 Drawing Sheets

METHOD AND SYSTEM FOR MANAGING ROLE PLAYING GAME INFORMATION

BACKGROUND OF THE INVENTION

1. Field of the Invention

The present invention relates generally to methods and systems for managing information. specially, the present invention is directed toward a method and system for managing role playing game information.

2. Description of the Related Art

Role playing games are heavily dependent on the use and availability of a large amount of information. Traditionally, this information has been available to players through resources such as instructions, manuals and other such supportive materials. In many traditional role playing games, such as Advanced Dungeons and Dragons, produced by TSR, the amount of information necessary to play can be voluminous and difficult to manage.

In particular, the resource materials specific to the game scenario being played, also known as the "adventure," are of vital importance to a referee. Traditionally, the referee is the person responsible for designing and documenting the adventure and all of its components. This documentation is performed according to the rule system provided by the game producer. This involves, among other things, many pages of maps ranging from large to small scale, many pages of text describing personalities and objects encountered in the adventure, as well as background information describing the environment surrounding the players in the imaginary "world" of the scenario.

Role playing game producers traditionally produce large resource books containing the information necessary for the referee to accomplish his/her tasks. Each of these resource books is called an "adventure module" or "campaign module" depending upon its size and scope. These resource books contain all the information necessary for the referee to adequately manage the game for the players.

The traditional resource books provided by role playing game producers are inflexible in the sense that they are tailored to a specific refereeing style chosen by the producer. Although some resource books are more flexible than others, taking advantage of the flexibility requires additional effort on the part of the referee. The more flexible resource books require even more information making these adventure and campaign modules large, unwieldy and inefficient.

The larger a resource book is, the more studying the referee must undertake before a game can be played. This is particularly true of the campaign modules providing materials and information regarding entire countries or large scale geographic areas.

As the market for role playing games expands, it becomes increasingly clear that traditional role playing games have certain shortcomings. A first shortcoming is that game information is conveyed in physically large printed volumes. These large physical volumes require considerable effort to deliver them from the game producer to the ultimate consumer. A player must reserve is space, typically on a shelf, to store the volumes during and after playing the game, and only one player may use the manual at a time.

A second shortcoming is that these large volumes of information are inefficient and difficult to manage. A player can easily tear and/or lose pages from the volumes. Advanced players may find it difficult to locate necessary information due to the physical size of the manuals. Beginning players may find it difficult to locate necessary information due to their limited role playing vocabulary and the inherent limitations of manual indices.

A third shortcoming is that these large volumes increase the possibility of human error in determining game events. It is easy for players to miss critical information which is distributed throughout the manuals.

A need therefore exists for a method and system which address the shortcomings of the role playing information management techniques presently known and available. In view of the prior art, there is a need to develop a method and system which reduces the physical size of the resource materials needed to play a role playing game. Further, there is a need to increase the efficiency of using role playing resource materials and decreasing the chance of human error.

It is, therefore, an object of the present invention to provide a method and system for managing role playing game information which results in less physical storage requirements than prior art alternatives.

It is a further object of the present invention to provide a method and system for managing role playing game information which allows easy retrieval of role playing game information.

It is additionally an object of the present invention to provide a method and system for managing role playing game information which reduces the likelihood of human error in identifying relevant role playing game information.

SUMMARY OF THE INVENTION

The foregoing and other objects are achieved by this invention which provides a method for presenting information related to a role-playing game world. The method is implemented using a general purpose digital computer having a processor, a memory, an input device and an output device. The method begins with the step of providing a plurality of data sets. The data sets are grouped into at least two collections. Each data set in the first collection defines the graphical appearance of a graphical object representing an element of a role-playing world. Each data set in the second collection includes data associated with an element of a role-playing world including a level of detail. The method includes the step of displaying the objects associated with a first level of detail. The method also includes the step of receiving a user-generated signal from the input device. The user-generated input signal represents a selection of one of the presented objects. The method further includes the step of identifying the game information data associated with the selected object. The method concludes with the step of presenting, on the output device, role-playing game information based on the game information data.

The foregoing and other objects are also achieved by a second aspect of the present invention which provides a method for managing information related to a role-playing game world. The method is implemented on a general purpose digital computer having a processor, a memory, an input device and an output device. The method begins with the step of providing a plurality of data packages representing elements of a role-playing world. Each data package contains data representing role-playing game information. The method includes the step of receiving a user-generated data signal from the input device. The user-generated data signal represents user-defined role-playing game information. The user-defined role-playing game information is then stored. The method further includes the step of receiving a user-generated inquiry signal representing an inquiry for role-playing game information. The method concludes with the step of presenting on the output device the user-defined role-playing game information in response to the inquiry signal.

BRIEF DESCRIPTION OF THE DRAWINGS

Comprehension of the invention and its objects is facilitated by reading the following detailed description, in conjunction with the annexed drawings, in which.

DETAILED DESCRIPTION

In order to simplify the disclosure of the present invention and to provide a concise description of the best mode for practicing this invention, it will be described in connection with a specific operating environment.

Interactive World Resource Guide ("IWRG") Operating Environment

Figure 1:
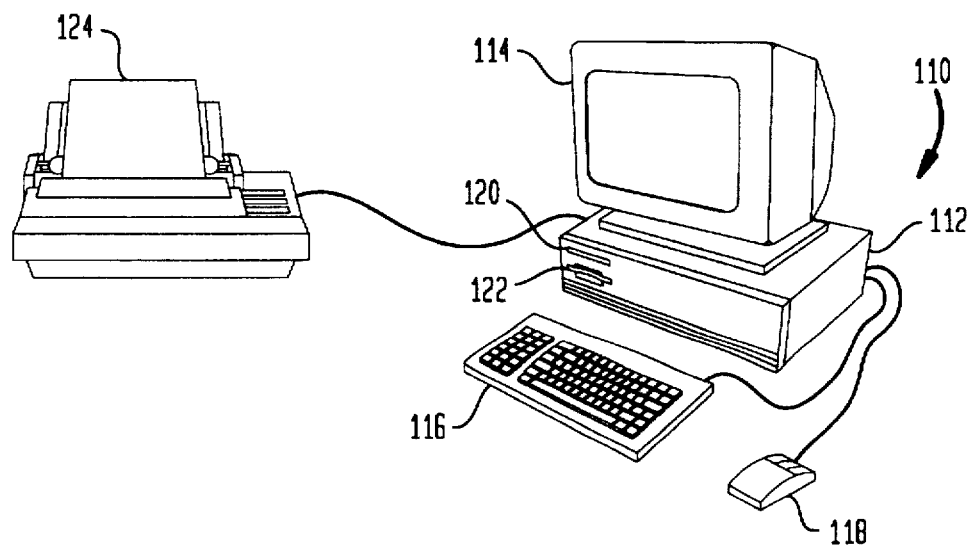
FIG. 1 is a schematic view showing a typical hardware configuration in accordance with the present invention.

The method of the present invention is embodied in the IWRG. Referring now to the drawing figures, as illustrated in FIG. 1, the present method of managing role playing game information may be implemented on an IBM compatible Personal Computer ("PC") system 110. PC system 110 includes a cabinet 112 having a processor (not shown) and random access memory (not shown). Preferably, the processor is a pentium 133 MHz processor, and the random access memory is sufficient to execute applications designed for the Microsoft Windows™ operating system.

PC system 110 further includes a monitor 114, keyboard 116, pointing device 118 and printer 124 all connected to cabinet 112. Although various hardware options are acceptable, it is preferred that monitor 114 is at least a Super-VGA monitor, keyboard 116 is an enhanced keyboard and pointing device 118 is a mouse.

In addition, chassis 110 should include a hard disk drive 120 and a CD-ROM reader 122. Preferably, hard disk drive 120 should be large enough to store the application implementing the method of the present invention. Further, it is preferred that CD-ROM reader 122 be capable of reading at eight (8) times standard speed, although slower speeds may be acceptable depending on the specific implementation.

Although the present invention may be implemented as described above, the present invention may also be implemented in a Macintosh environment. In the Macintosh environment, the present invention requires a minimum configuration of Mac-OS running on a Performa 600 having 15 Mb of available disk storage, 4 Mb of RAM, and multimedia capabilities. A prototype Macintosh IWRG engine has been developed using HyperCard 2.3, however most commercially available authoring packages, such as Mac Director, would be suitable to implement a commercial version of the IWRG. A programmer of ordinary skill would have no difficulty in implementing the present invention on the basis of the information contained herein.

The IWRG is an IBM-compatible, Windows-based software application, preferably stored on one or more CD-ROMs. Unlike the prior art methods which require a referee to sift through stacks of written materials when generating a game scenario, or adventure, a referee utilizing the present invention can simply execute the IWRG for the campaign module in which a game takes place.

Using the IWRG, the referee or player may easily review maps, graphics, video clips, music, and text descriptions of the elements in the chosen "world" without contending with voluminous written materials. Further, the IWRG provides the facility to conduct an information "search." Using this facility, the referee or player is able to access immediately information to create a new scenario and/or adventure.

In the event a hard copy version of the material is desired, the IWRG provides the facility to print information stored on the CD-ROM. This facility can also aid in the creation of specially tailored, easily constructed, resource material for the gaming adventure. All of the navigation and utilization of the IWRG is accomplished using a pointing device, such as a mouse, to select and activate icons and other displayed "point and click" objects such as features on maps.

The IWRG reduces the necessity for voluminous and difficult to assimilate role play resource materials for role play game referees. The IWRG accomplishes this by allowing the referee to develop a pre-generated campaign module which outlines an entire game and includes any and all information pertinent to the game being played. With just a few points and clicks using a known pointing device, such as mouse 118 in the computer embodiment of FIG. 1, the referee, before or during a game, may execute the IWRG to create a campaign and may print a condensed, ready-to-play scenario based on certain identified information and/or geographic areas.

Using the IWRG, referees are no longer required to sift through several background information booklets, hundreds of pages of text, various maps, and rule books when they desire information on a given topic. Instead, all elements of information are thoroughly indexed by the IWRG and available immediately to the referee. This allows the referee to exercise more creativity in developing a story line, more completely access and understand the applicable rules, and more easily design new situations and utilize existing situations within a pre-generated campaign module.

Using the IWRG, a referee can use a computer, even a notebook computer, to run a predesigned and stored adventure. Supplemental visual aids for the game, such as maps, illustrations of objects and personalities, short video clips of moving objects or persons, can be displayed to the players using the computer screen. Even sounds and music can be activated using the IWRG and presented via speakers connected to the computer to create a mood or provide a vivid description of a sound heard by the players.

Figure 2:
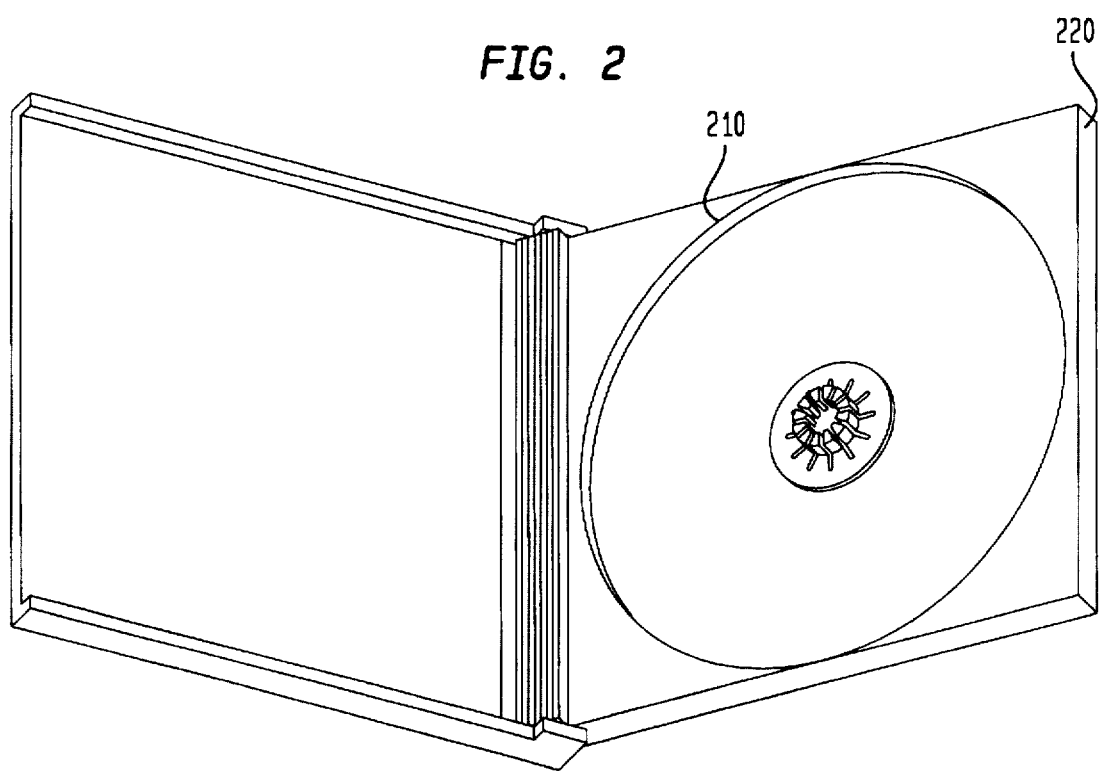
FIG. 2 is a perspective view of the preferred article of manufacture of the present invention.

Referring now to FIG. 2, there is illustrated the preferred article of manufacture of the present invention. The software embodying the method of the present invention is preferably stored on at least one CD-ROM 210. CD-ROM 220, containing the instructions and data necessary to execute the steps of the method of the present invention, is distributed and stored in a case 220.

Although CD-ROM 220 is the preferred article of manufacture of the present invention, other articles of manufacture including magnetic disks, magnetic tapes, cartridges are all viable alternatives. Further, it is envisioned that the instructions and data of the present invention may be distributed electronically using existing telecommunications equipment (not shown).

The preferred IWRG user interface is based on geography. User inquiries are initially selected from a large scale map of a geographic region. This highly detailed map is based on a three-dimensional or topographical model of the geographic region. The IWRG application includes digitized graphic data of the various geographic regions. Typically, this graphic data, stored on CD-ROM 210, is a high-resolution bitmap representing scanned photographs of the geographic region. The map may include areas of interest and landmarks which can be selected by a user. Upon selecting an area of interest or landmark by pointing and clicking on an associated icon, the IWRG reveals relevant stored information.

Upon accessing an element of information, additional information, graphics, smaller scale maps, personalities, legends, descriptions of wildlife and creatures, even descriptions of the local culture in an area, become available to the user. Preferably, only the IWRG machine code instructions and a read file are loaded directly onto the user's hard drive. In this way, the memory on hard disk drive 122 is conserved. The role playing game data is stored on CD-ROM 210 and accessed by the read file using CD-ROM reader 120.

CD-ROM 210 contains the information elements describing the world in which the fantasy game takes place. The information elements are accessible in a manner consistent with the previously described geographic features of the large map of the region. In other words, while viewing a graphic of a person (not shown), for example, the user can click on that person's hat (not shown) to see if there is more information about the hat specifically.

Figure 3:
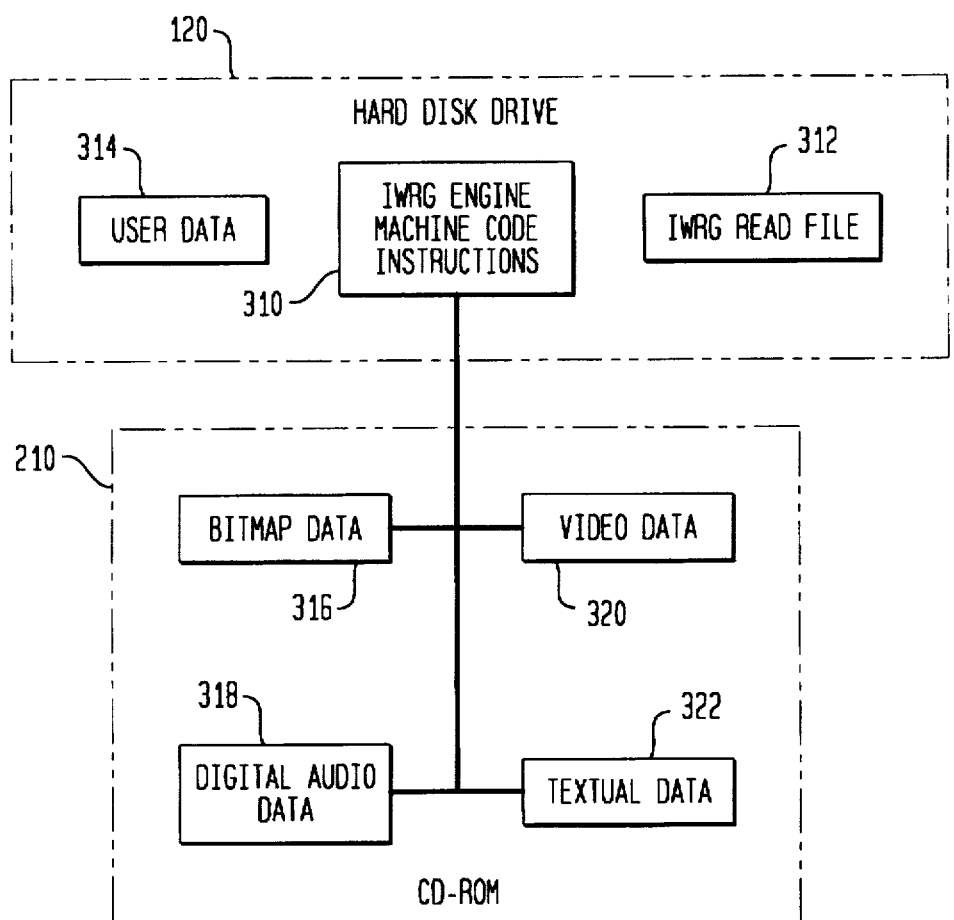
FIG. 3 is a generalized block diagram describing the preferred architecture of the present invention.

Referring now to FIG. 3, there is illustrated in block diagram format, the architecture of the preferred embodiment of the present invention. When properly installed, the hard disk 120 of the PC 110 on which the IWRG will operate contains three components: the IWRG engine machine code instructions 310; the IWRG read file 312 and the user data 314.

The IWRG engine contains the machine code instructions 310 which control the IWRG's functionality including the IWRG user interface. The IWRG read file 312 is a driver which provides an interface between the IWRG engine and the data which defines the game and playing environment. The standard or default data 316–322 is static and may be stored on a CD-ROM 210. The user defined or dynamic data 312–314 is stored on the hard disk 120 so that it may be changed as a game progresses.

Figure 4:
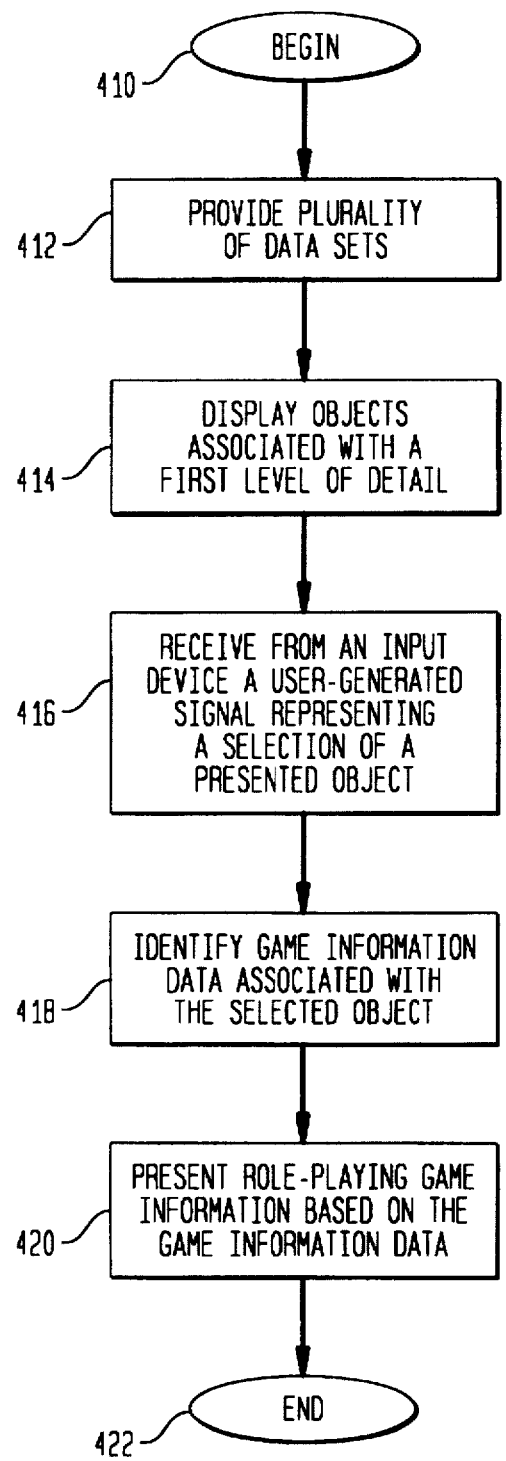
FIG. 4 is a flow chart illustrating the steps necessary to retrieve information in accordance with the present invention.

FIG. 4 is a flow chart depicting a specific illustrative the method in accordance with the invention for presenting information related to a role-playing game world. The method begins at block 410 and proceeds to block 412 representing the step of providing a plurality of data sets. The data sets are grouped into at least two collections. The data sets of the first collection define the graphical appearance of objects representing elements of the role-playing world. The data sets of the second collection include other data, such as a level of detail, associated with elements of the role-playing world. The method continues with the step of presenting objects associated with a first level of detail, as shown at block 414.

Block 416 denotes the step of receiving a user-generated signal via an input device. The user generated signal represents a selection by the user of a presented object. Next, as shown at block 418, the method includes the step of identifying game information data associated with the selected object. Block 420 shows that the next step of the method is the step of presenting role-playing game information based on the game information data. The method ends at block 422.

Figure 5:
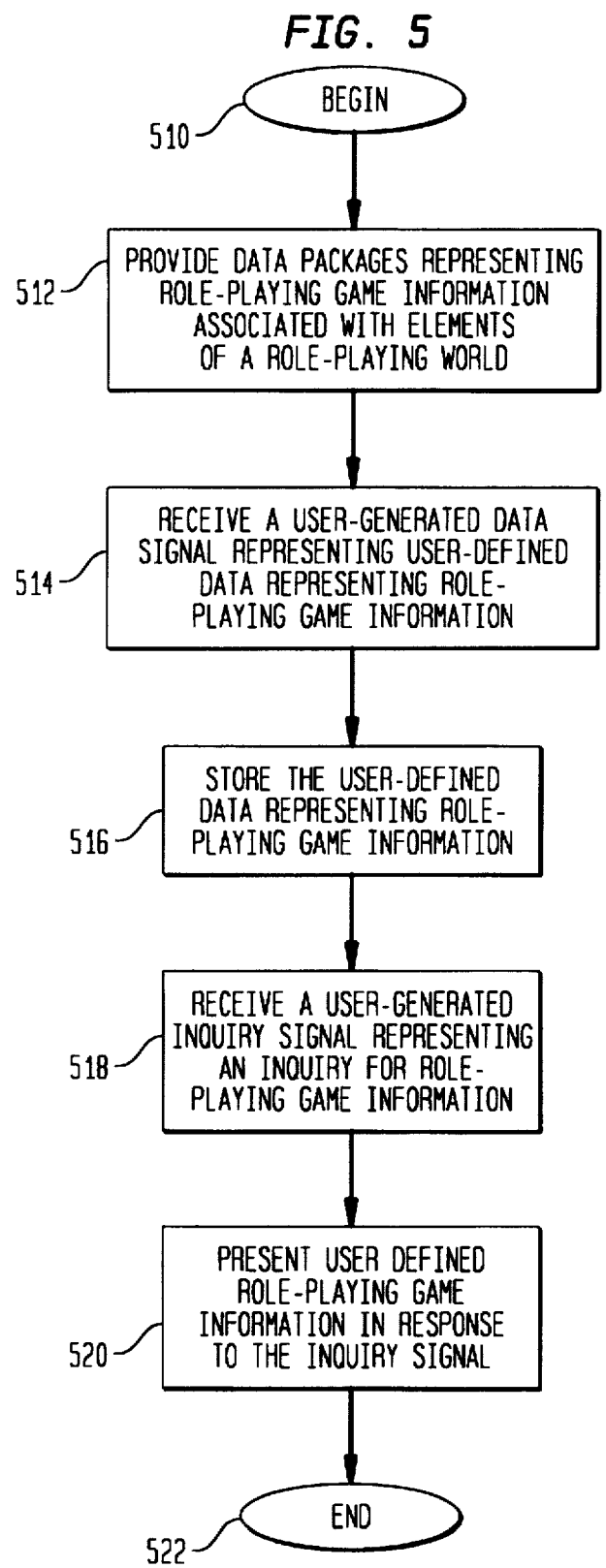
FIG. 5 is a flow chart illustrating the steps necessary to store information in accordance with the present invention.

FIG. 5 is a flow chart illustrating the method for managing role-playing game information related to a role-playing game world. The method begins at block 510 and proceeds to block 512 representing the step of providing data packages representing role-playing game information associated with elements of a role-playing world. As shown at block 514, the method continues with the step of receiving a user-generated signal representing user-defined data representing role-playing game information. The user-defined data representing role-playing game information is then stored, as shown at block 516.

The method continues at step 518, wherein the user-generated inquiry signal is received via an input device. The signal represents a user inquiry for role playing game information. Next, as shown at block 520, the method includes the step of presenting the user-defined role playing game information in response to the inquiry signal. The method ends at block 522.

ILLUSTRATIVE EXAMPLE

Figure 6:
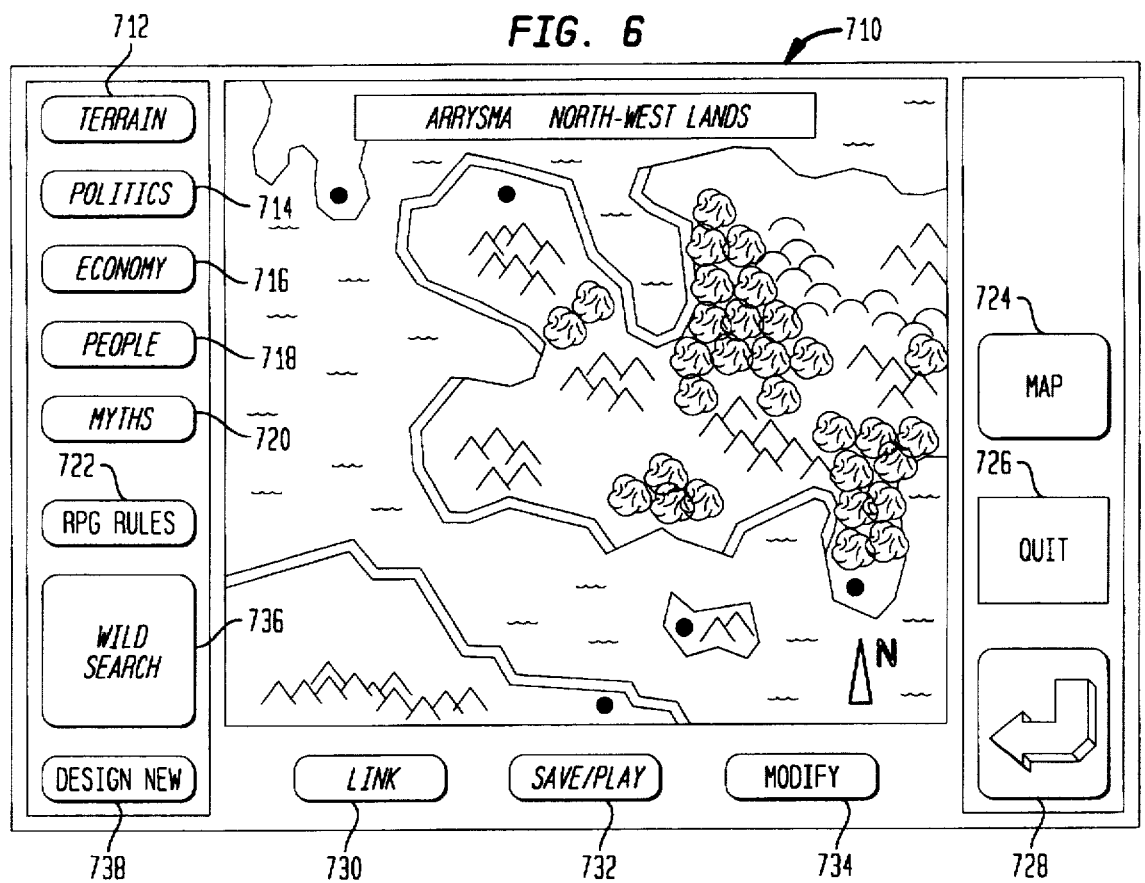
FIGS. 6–20 are various screen displays illustrating the preferred embodiment of the present invention.

The utility of the present invention is well illustrated by describing the operation of the IWRG as applied to an original campaign module and fantasy world called "Arrysma." A referee planning an adventure using the present invention would invoke the IWRG using Windows™ or Mac-OS. After a brief introductory sequence, the IWRG engine presents the referee with a screen display such as that illustrated in FIG. 6. The illustrated screen display includes a window 710 which provides the referee with a full view of the geography of the world of Arrysma.

As illustrated, the screen also includes a number of graphical information buttons 712–722 which are displayed whenever the referee is permitted to request context-sensitive information regarding the contents of window 710. Buttons 712–720 allow the referee to select a displayed game element from window 710 and receive game information which is logically related to the selected element. Upon clicking a button, the IWRG provides the referee with information relevant to the contents of window 710 and the topic of the selected button. Selecting button 712, for example, causes information regarding terrain to be displayed in window 710. Similarly, clicking buttons 714–720 causes information regarding politics, economy, people and myths, respectively, to be displayed in window 710.

Button 722 allows the referee to obtain information regarding the rules of the role playing game. All information which is displayed in window 710 can be textual or graphical and may be accompanied by digitized or synthesized audio.

The IWRG interface further includes graphical buttons 724–728. Selecting button 724 causes the IWRG to display the map of Arrysma in window 710. Selecting button 726 causes the IWRG to terminate the current session. If game information has been modified but not saved, the IWRG will prompt the referee to save the game information prior to terminating the session. Selecting button 728 invokes a "return" function which causes the IWRG to display the previous contents of window 710.

As illustrated, the IWRG interface also includes buttons 730–734 below window 710. Selecting button 730 invokes a "link" function which allows direct access to an information element, regardless of its subject matter or level of detail, using a pre-determined index of filenames. The "Save/Play" button 732 allows the referee to save a sequence of actions, similar to a macro, in a file for future reference. Button 732 also allows a saved action sequence to be replayed. The "Save/Play" function is described in more detail with reference to FIG. 15.

The "Modify" button 724 indicates the referee's desire to modify or customize the contents of the world, such as maps, textual descriptions and graphical representations. The modified contents of the world can be saved or may replace the original contents of the world. This button causes the IWRG to "unlock" the images and text stored in the IWRG data base. The referee must select the "Design New" button 738 to actually effect any changes to the text or graphics.

The "Wild Search" button 736 allows the referee to search for information. After selecting button 736, the IWRG prompts the referee for text for which to search. Using the text provided by the referee, the IWRG of the ss a simple word search against a predefined index. The results of the search are presented to the referee who may select an entry of interest. The IWRG displays the selected entry in window 710.

Finally, the IWRG interface includes "Design New" button 738. Selecting this button causes the IWRG to display an editting window within the IWRG environment containing the graphics or text tools that can be used to add new or modify existing information managed by the IWRG.

Figure 7:
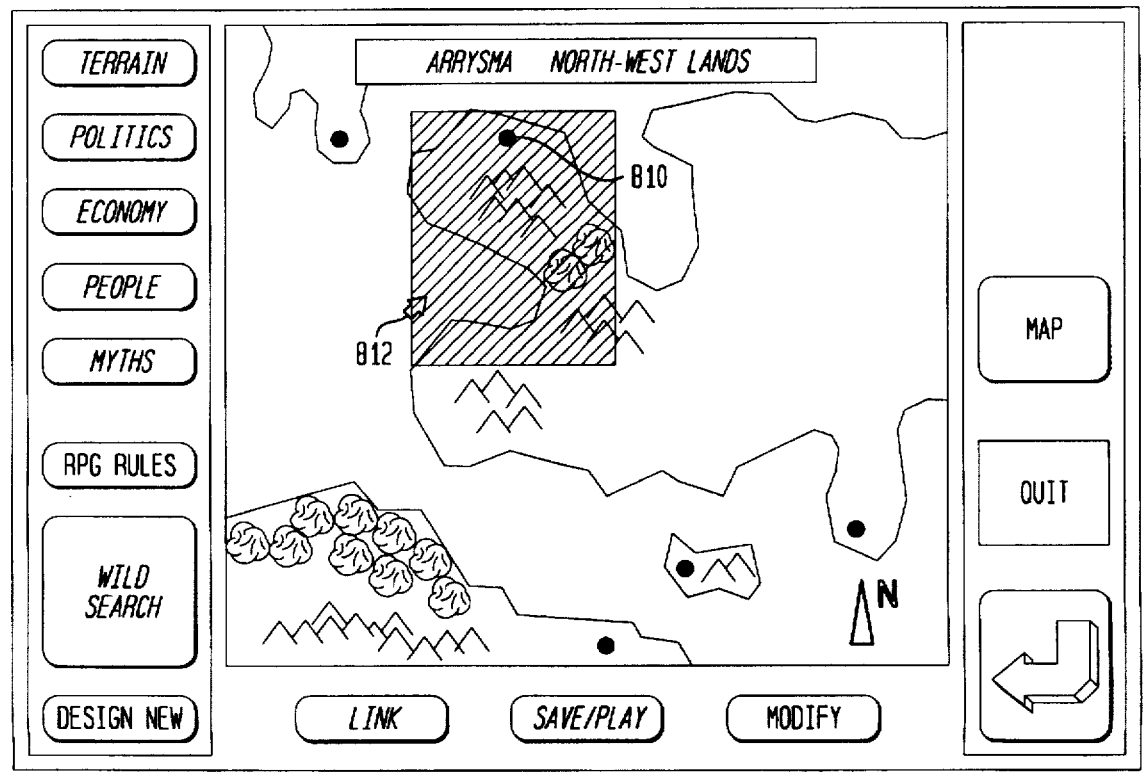
Figure 8:
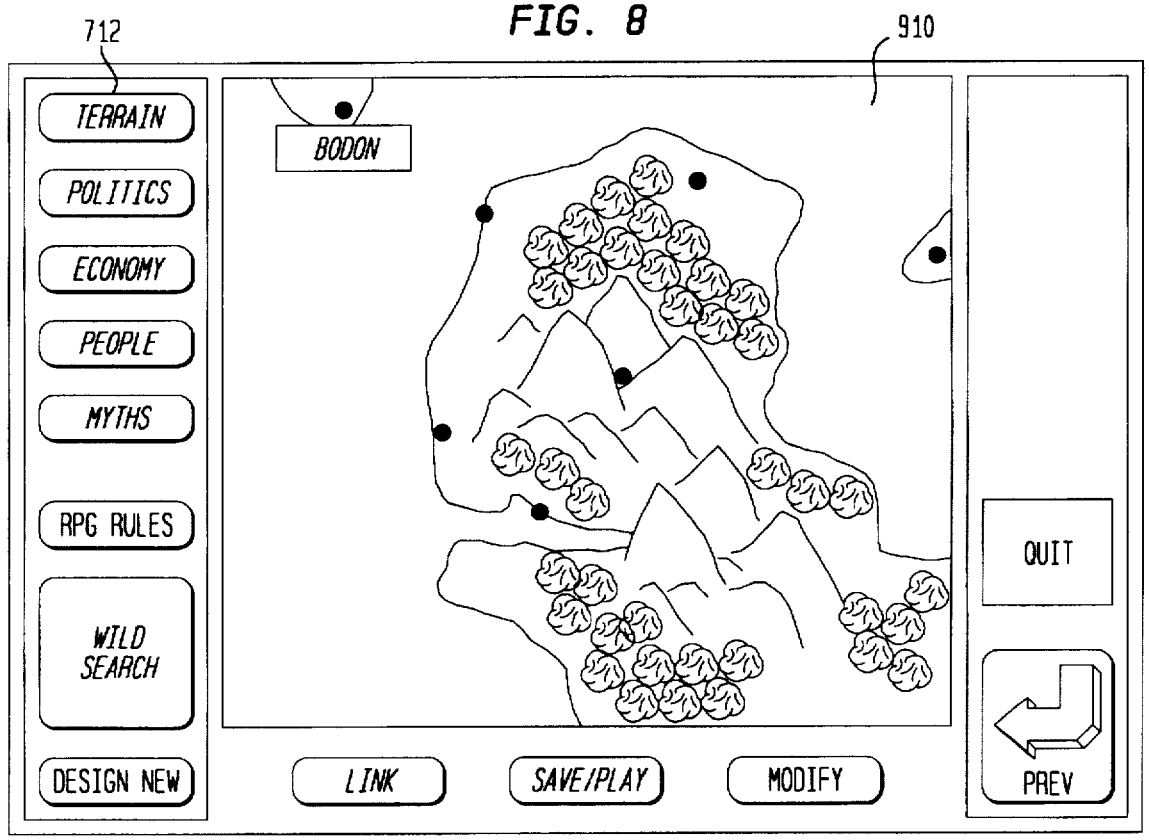
Figure 9:
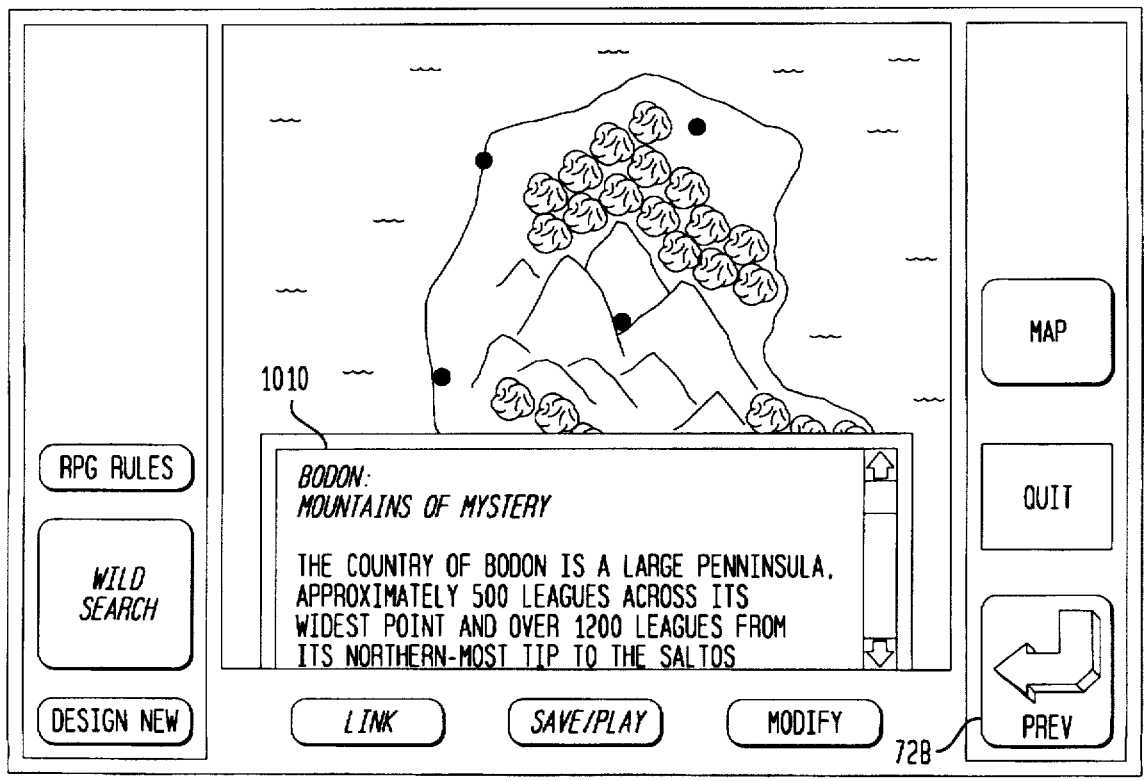

Referring now to FIG. 7, the referee may use cursor 812 to select a region 810 about which he wishes to receive additional information. As shown in FIG. 8, after selecting region 810, representing the country of Bodon, the IWRG causes a larger scale map of the region 910 to be displayed in window 710. Although in this example the selection of region 810 resulted in the presentation of a second graphic display, it could easily have been linked, instead, to an animated or other presentation. The referee, finding the country of Bodon interesting, selects "Terrain" button 712 to receive additional geographic information regarding Bodon. As illustrated in FIG. 9, selection of button 712 causes the IWRG to remove buttons 712–722 and display text box 1010 in window 710. The textual information in text box 1010 describes the terrain of Bodon and allows the user to scroll through its contents using standard Microsoft Windows™ or Macintosh window controls. Selecting button 728, the user prompts the IWRG to redisplay the contents of window 710 as illustrated in FIG. 8.

Figure 10:
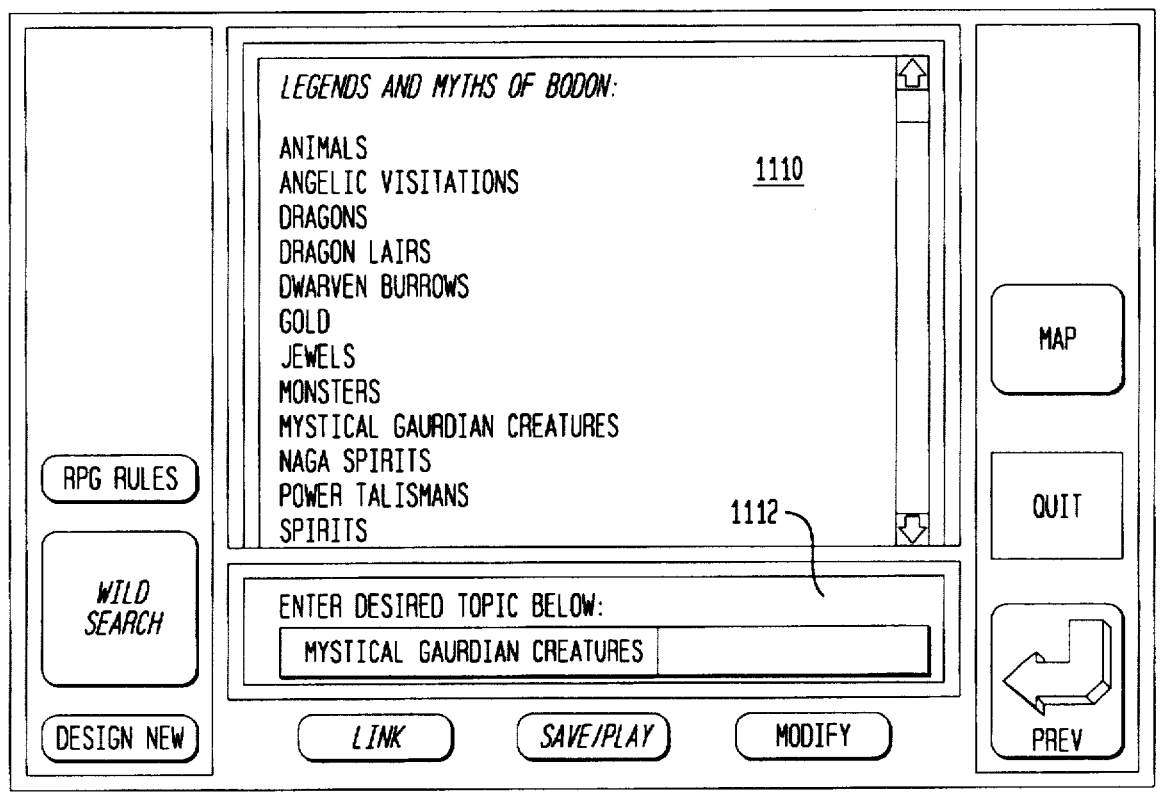
Figure 11:
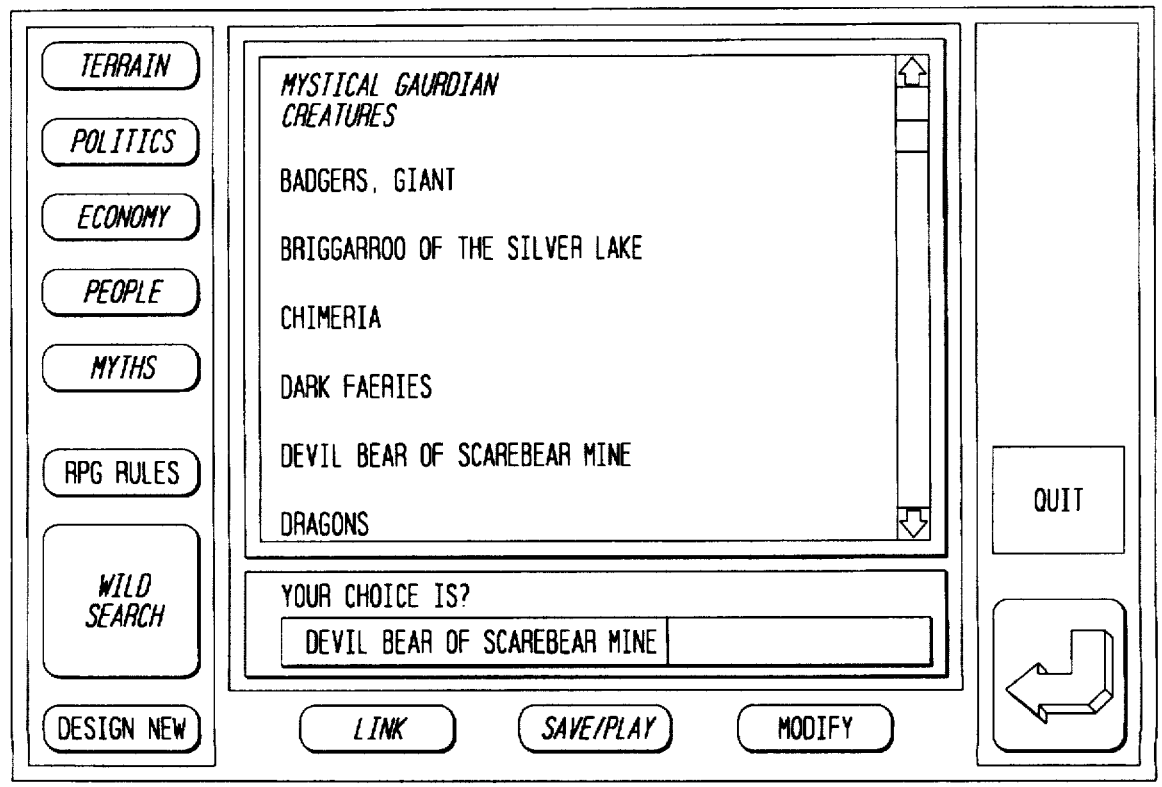

Selection of "Myths" button 720 by the referee causes the IWRG to display scroll box 1110 and input box 1112 in window 710 as illustrated in FIG. 10. Scroll box 1110 contains a list of topics indexed under "Legends and Myths of Bodon." The referee may select a topic from the displayed list or may enter the desired topic in text box 1112. Upon receiving "Mystical Guardian Creatures", the IWRG displays the contents of window 710 as illustrated in FIG. 11.

Figure 12:
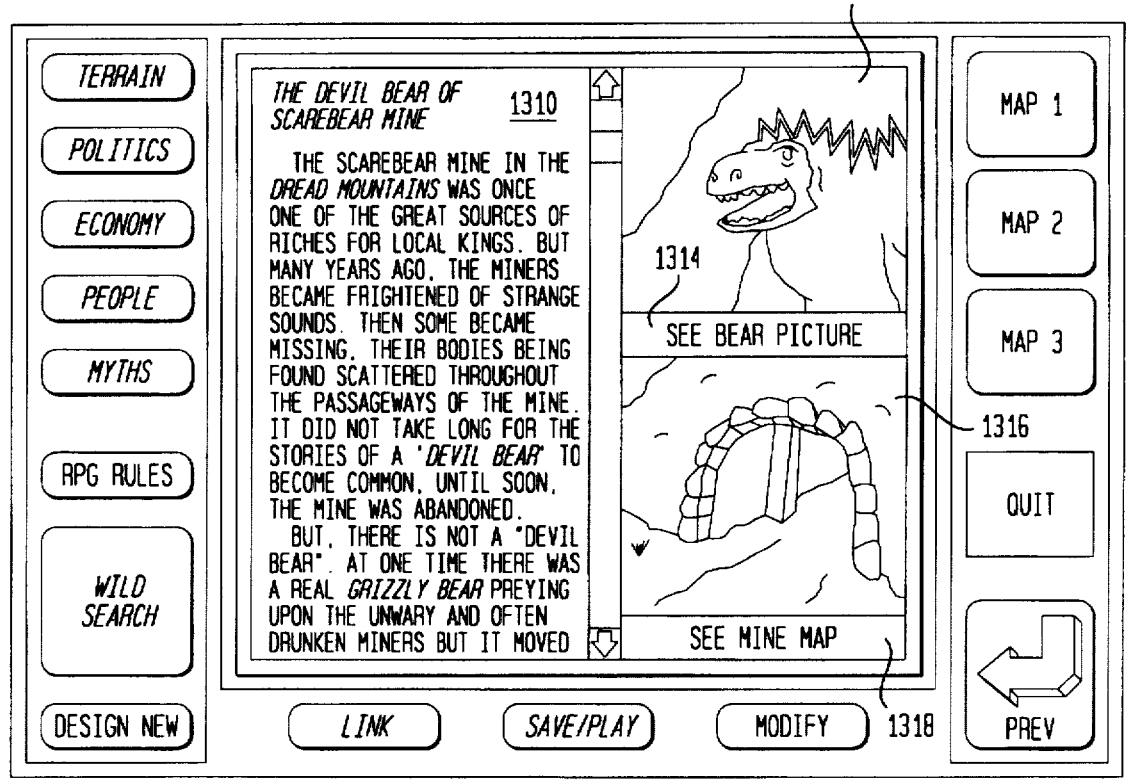

Window 710 now includes scroll box 1210 and input box 1212. Scroll box 1210 contains a list of topics indexed under "Mystical Guardian Creatures." The referee may select a topic from the displayed list or may enter the desired topic in text box 1212. Upon receiving "Devil Bear of Scarebear Mine", the IWRG displays the contents of window 710 as illustrated in FIG. 12.

The referee's request for information regarding "Devil Bear of Scarebear Mine" results in window 710 containing scroll box 1310, pictures 1312 and 1316, and link elements 1314 and 1318. Scroll box 1310 contains a textual description of the Devil Bear of Scarebear Mine. Scroll box 1310 includes standard Windows™ and Macintosh window controls. Picture 1312 is displayed above link element 1314. Selection of link element 1314 by the referee provides further information regarding the subject matter of picture 1312. Picture 1316 and link element 1318 have a relationship similar to 1312 and 1314.

Figure 13:
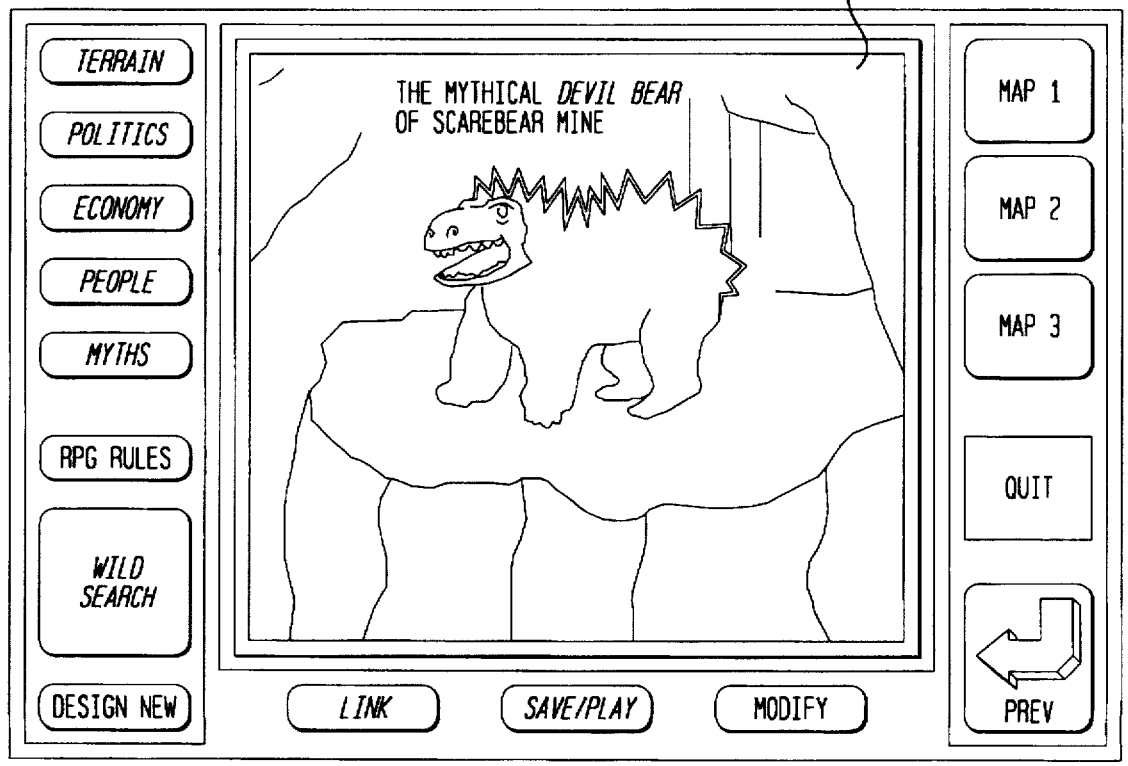
Figure 14:
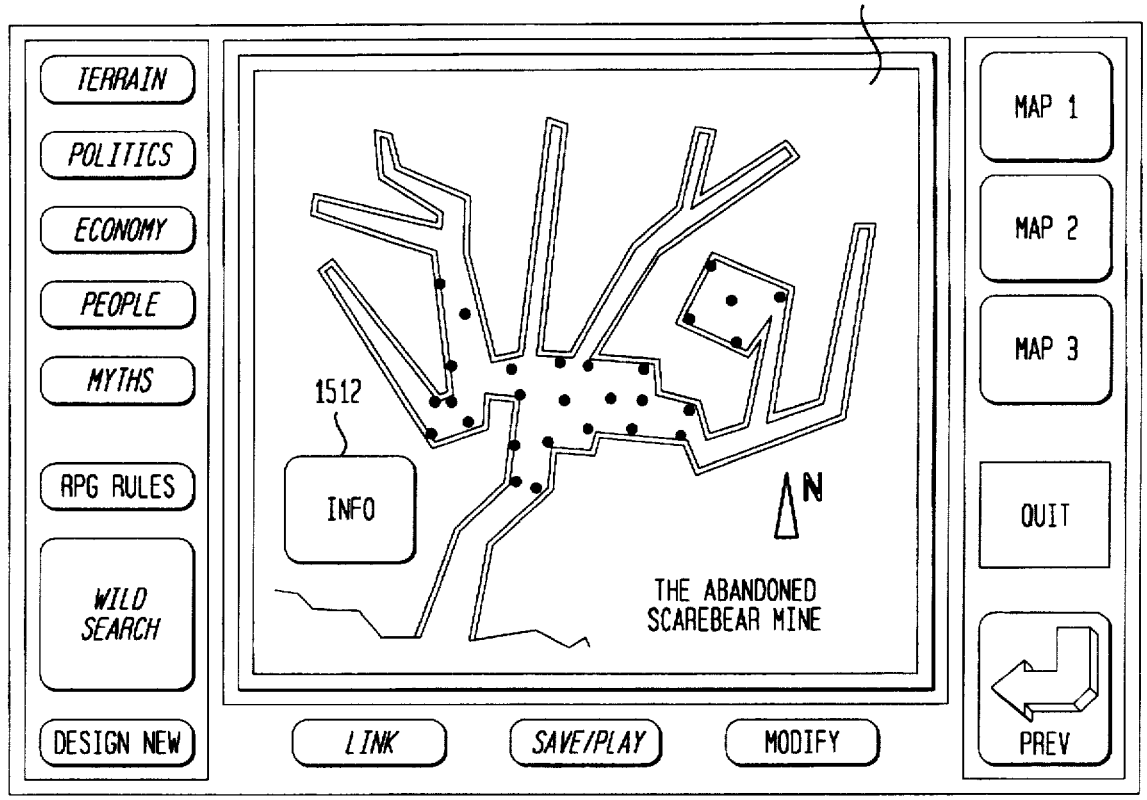

FIG. 13 illustrates the IWRG response to the referee's selection of link element 1314. As shown, window 710 contains a more detailed digitized picture 1410 of the mythical Devil Bear. In addition, a digitized audio file is presented in conjunction with picture 1410 to further depict the Devil Bear. FIG. 14 illustrates the IWRG response to the referee's selection of link element 1318. Here, window 710 contains a detailed map 1510 of the abandoned Scarebear mine.

Window 710 also contains button 1512 which the referee may press to receive additional information regarding the abandoned Scarebear mine.

It is sometimes desirable for the referee to be able to identify a sequence of selections for future reference. Such a sequence can be useful for briefing players on certain elements of a world or scenario prior to or during an adventure game. It may also be a useful tool for allowing the referee to review specific selections.

Figure 15:
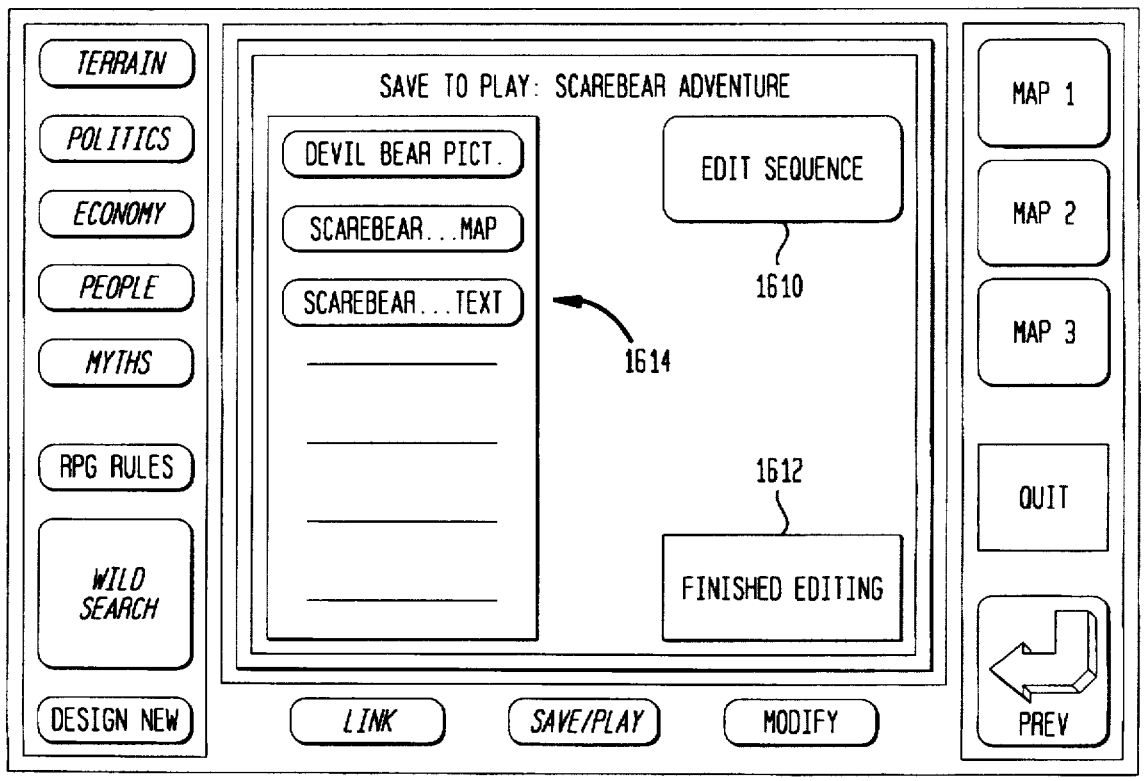

The sequence may be stored as a list or linked-list of pointers. The pointers would preferably be file names, but could be an index which identifies each entry in the sequence of identified windows. At any time, the referee may wish to add the current contents of window 710 to the save to play list. By selecting "Save/Play" button 732, the referee can prompt the IWRG to add a pointer to the current contents of window 710 to the list and display the "Save to Play" interface in window 710, as illustrated in FIG. 15. The "Save to Play" interface includes a "Edit Sequence" button 1610, "Finished Editing" button 1612 and the list of identified selections displayed in window 1614.

Using button 1610 of this interface, the referee can edit and save the list of identified displays. The referee presses button 1612 when the referee is satisfied with the sequence of identified selections. Pressing button 1612 causes the IWRG to display the standard Microsoft or Macintosh file selection window, for saving the list of identified selections to disk. The displays identified by the list can be played back in a slide-show fashion at a later time.

Figure 16:
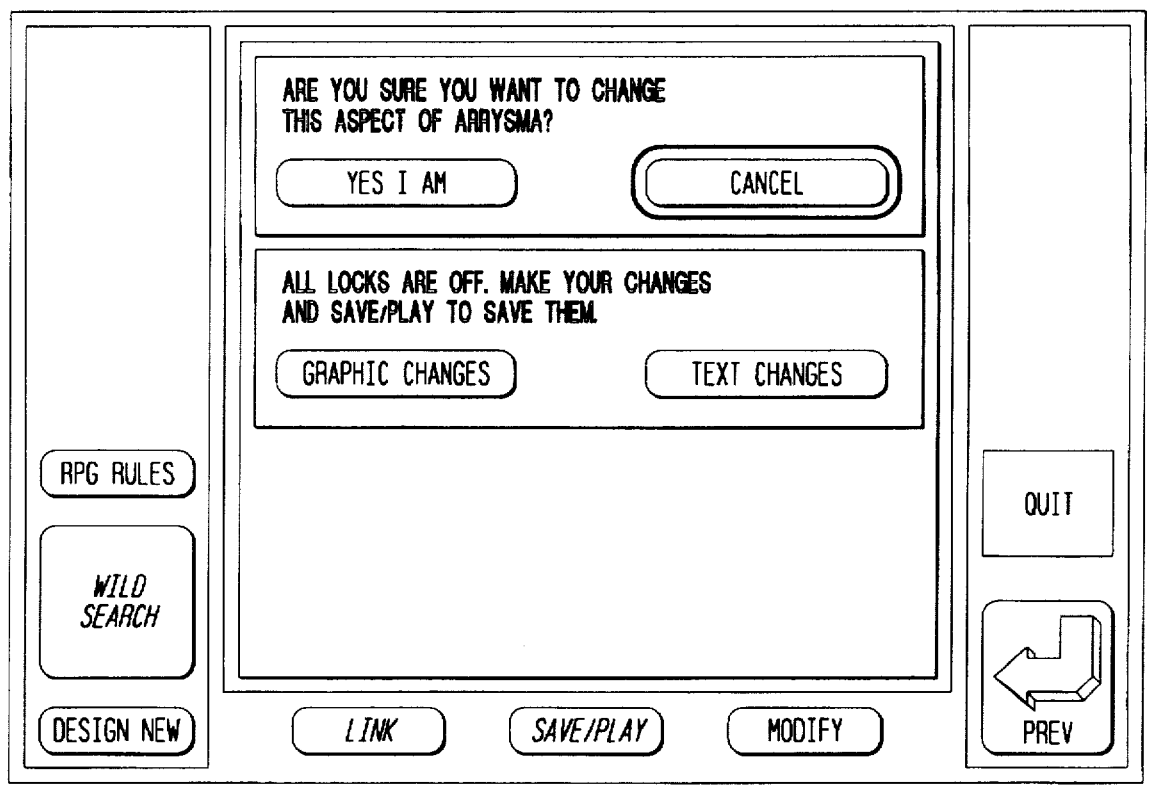
Figure 17:
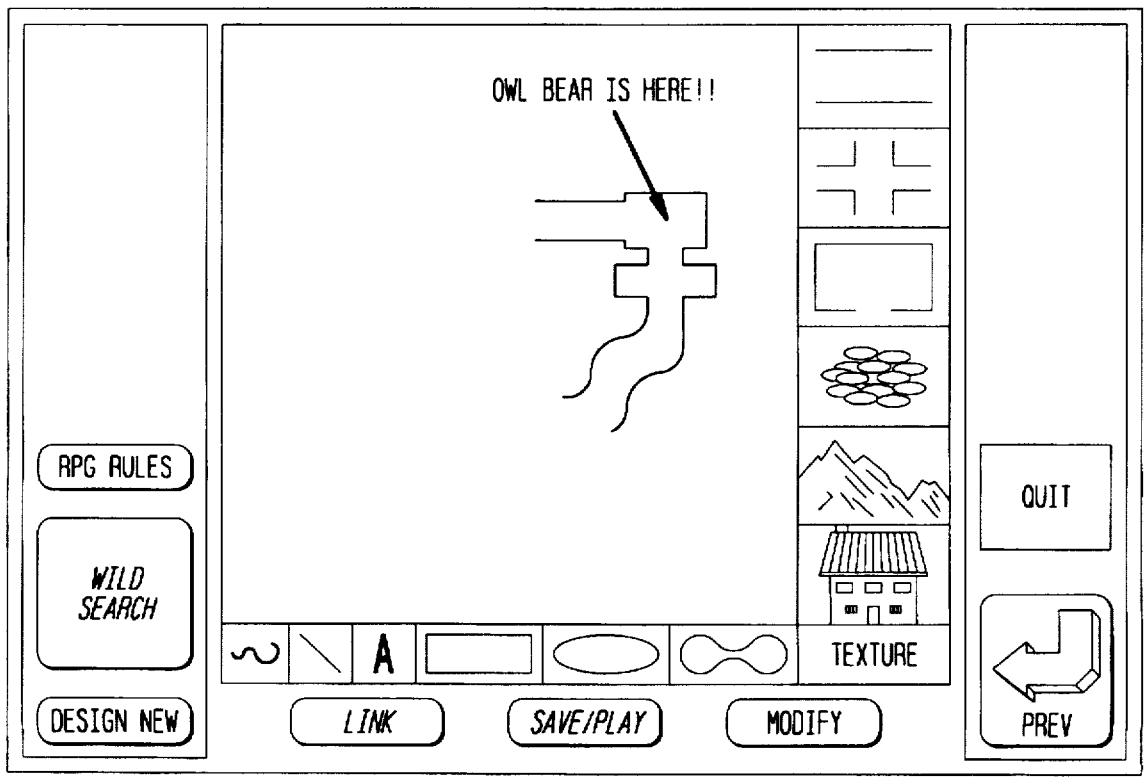

If the referee wishes to make permanent changes to an element of the role-playing world, for example the Abandoned Scarebear Mine illustrated in FIG. 14, the referee may select "Modify" button 734. Upon selecting button 734, the IWRG displays the contents of window 710 shown in FIG. 16. The first dialog box illustrated in FIG. 14 requests confirmation of the referee's desire to effect changes. After receiving confirmation, the second dialog box illustrated in FIG. 14 prompts the referee to indicate whether the changes will be made to text or graphics. Upon selecting either "Graphic Changes" or "Text Changes" the appropriate editing tools are provided. FIG. 17 illustrates the contents of window 710 resulting from the referee's selection of "Graphic Changes." As shown, the referee is provided rudimentary drawing tools with which to create and/or modify the selected graphic display. The tools illustrated in FIG. 17 are also available to the referee by pressing the "Design New" button 738 when navigating through the role-playing world information.

Figure 18:
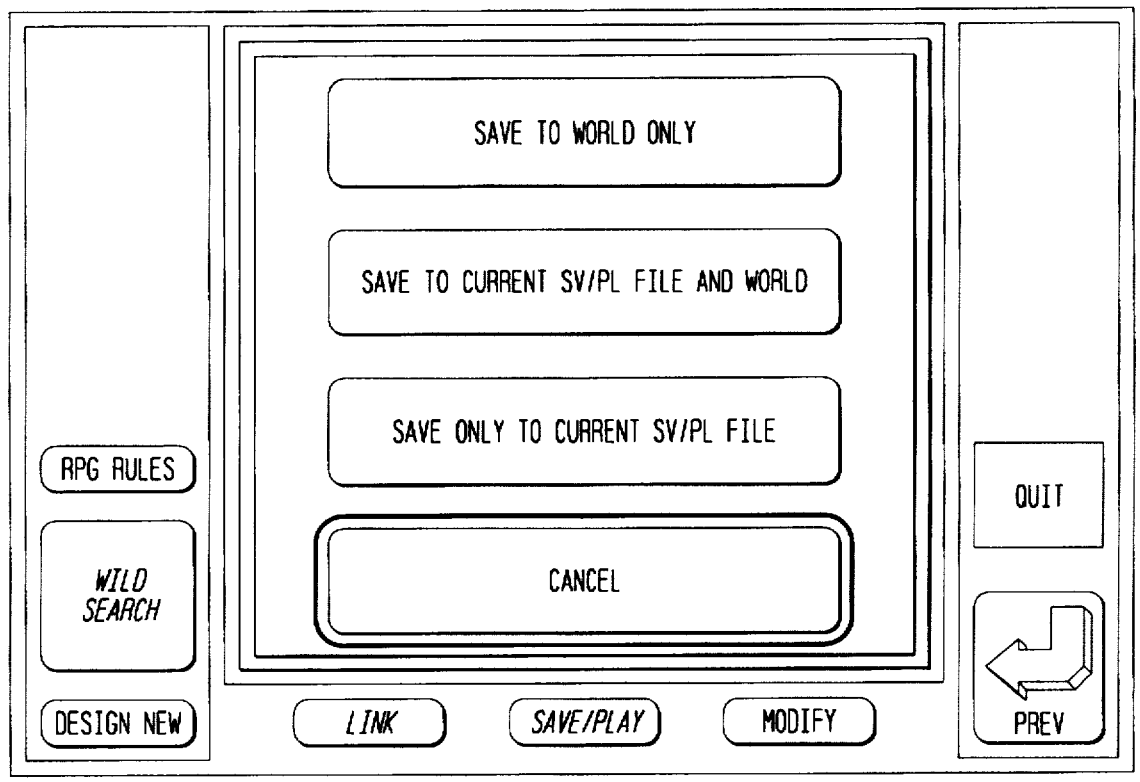

After completing the desired modifications the referee may select the "Save/Play" button 732 to cause the IWRG to display the contents of window 710 shown in FIG. 18. Using the selections in this window, the referee may effect changes only to the role-playing world; effect changes to only the current "Save to Play" file; effect changes to both the role-playing world and the "Save to Play" file; or cancel the request to save the changes.

Figure 19:
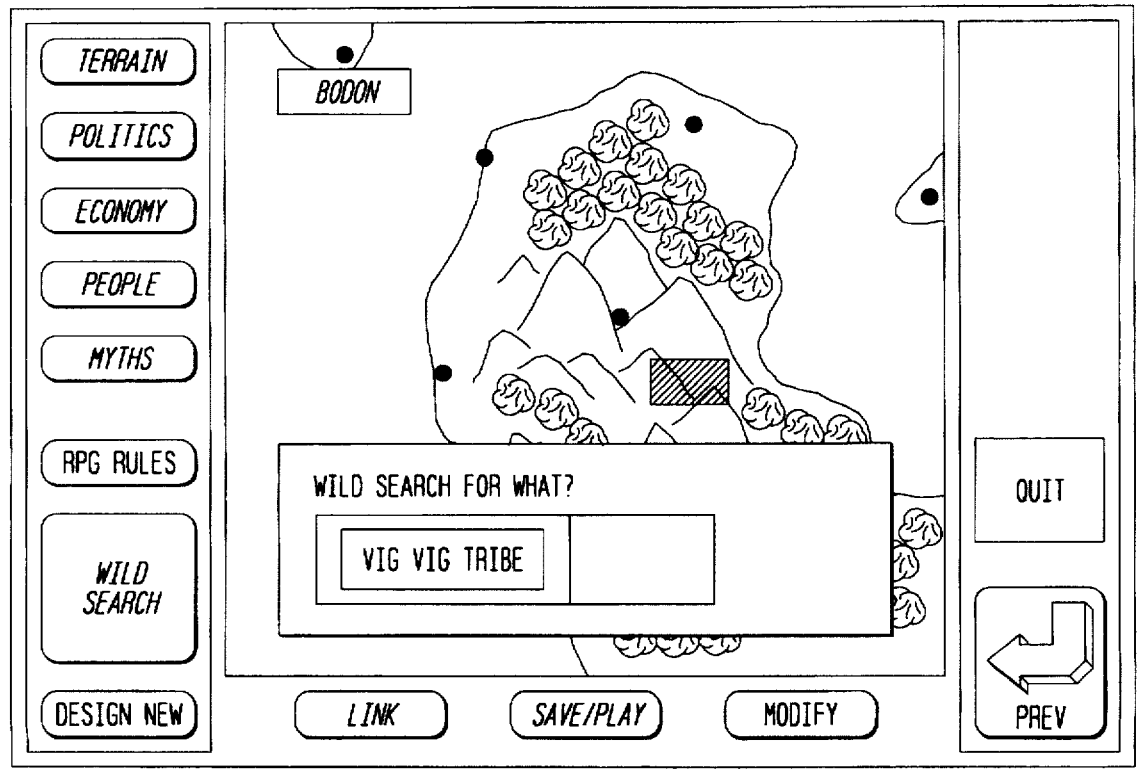
Figure 20:
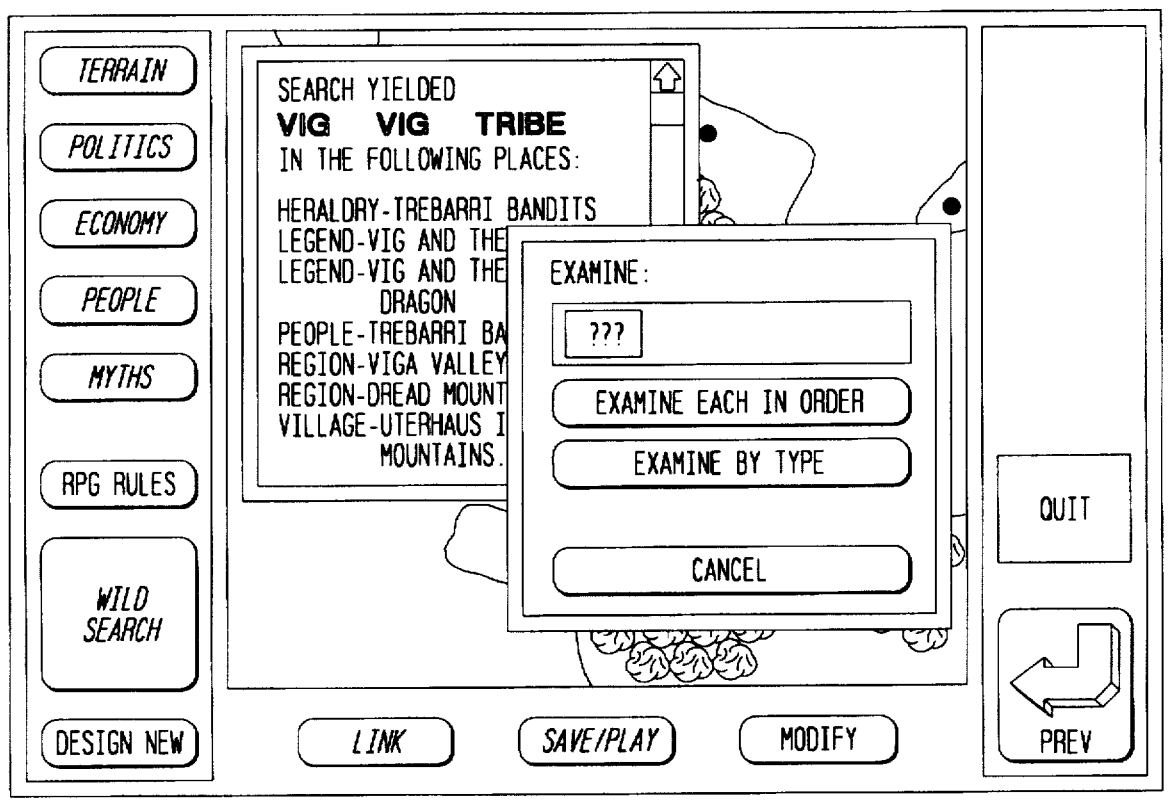

FIGS. 19 and 20 generally depict the results of the referee's selection of the "Wild Search" button 736. The "Wild Search" function employs an index and simple text search engine to allow the referee to easily locate information related to a specific topic. As shown in FIG. 19, upon selecting button 736, the referee is prompted to input key words in an input window. The IWRG executes a search of an index and presents the referee with the results.

As shown, the results are grouped based on the type of information, such as map, legend or people. The IWRG prompts the referee to indicate how the located information is to be examined. The referee may wish to examine every occurrence of the key phrase in sequence or may wish to limited an examination by information type. If the referee choose, a specific occurrence of the key phrase may be examined using standard window controls and selecting the desired occupance. A link is maintained with the screen displayed prior to the selection of button 736, so that "Previous" button 728 may be used by the referee to navigate to the previous display.

The IWRG with the aforementioned features addresses two important areas in role playing that traditional role playing resources fail to address: World growth and/or customization and compact resources.

World Growth and/or Customization

World growth and/or customization is extremely important for role players. It maintains a continuity throughout their games. Events which occur when a group of adventurers play a game can be recorded using the IWRG. Examples of events players may wish to record include: the destruction of a castle, the slaying of a fearsome dragon that is part of the legends of a given area, or the liberation of an oppressed kingdom which becomes a bastion of freedom and hope.

Using the IWRG, the referee can modify the information contained within the original program so as to incorporate the results of the game recently played. For example, what was once a castle is now rubble, and legends of a fearsome dragon now tell of its death. Although the old version of a modified element remains on CD-ROM 210, the IWRG stores the new version of the modified element on the referee's local disk drive in a directory reserved for modifications.

When the system attempts to access the modified element, a "search loop" in the IWRG program first tests for the existence of modified information in the reserved directory on the local disk drive. If such modified information exists, the IWRG system presents the modified version in favor of the unmodified version stored on CD-ROM 210. This "search loop" also updates any information that is interconnected with the modified element. If desired, players can also create new structures, landmarks, or personalities. The ability to customize the world greatly increases the entertainment of the role players.

Compact Easy-to-Use World Resources

In one package, the IWRG contains the game world information required to play a game and to design and run a campaign in a particular world. Further, the information is available using a simple point-and-click procedure.

Although the present invention was designed to operate using a single CD-ROM, the IWRG may be expanded to require several CD-ROMs. For the expert players or collectors, new CD-ROMs with more detailed or specific information of various areas of the campaign world may be produced and utilized. Any world formatted on the IWRG system could be expanded to virtually infinite degrees of depth and richness. To the role-playing game referee who designs adventures, world information accessible using the IWRG is a significant improvement over the prior art.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are proffered to facilitate comprehension of the invention, and should not be construed to limit the scope thereof.

What is claimed is:

1. A computer-readable storage medium for use with a role-playing game, the storage medium configured to cause a computer to present role-playing game information, the computer-readable storage medium including a substrate having a physical configuration that represents data including graphical object data, role playing game information data, and machine instructions for directing a general purpose digital computer to perform the steps of:

providing a plurality of data sets including:
   a collection of first data sets, each of said first data sets defining a graphical appearance characteristic of a respectively associated graphical object corresponding to an information element of a role-playing world; and
   a collection of second data sets, each of said second data sets including role playing game information data associated with the information element of the role-playing world including a respectively associated level of detail;

presenting on an output device of the general purpose computer an image of a graphical object from a selected one of the first data sets, the image being responsive to a second data set and a respectively associated first predetermined level of detail;

receiving an input signal from a user-operated input device, the input signal corresponding to the graphical object, the image of which is presented in the step of presenting;

identifying one of the second data sets associated with the graphical object corresponding to the input signal received in the step of receiving; and further presenting on the output device of the general purpose computer at least a portion of the role-playing game information identified in the step of identifying.

2. The computer-readable storage medium of claim 1 wherein the step of further presenting includes the step of presenting an image of a graphical object from a selected one of the first data sets, the image being responsive to a second data set and a respectively associated second predetermined level of detail.

3. The computer-readable storage medium of claim 1 wherein the step of further presenting includes the step of displaying text describing the information element associated with the graphical object, the image of which is presented in the step of presenting.

4. The computer-readable storage medium of claim 1 wherein the step of further presenting includes the step of producing an audio signal associated with the information element associated with the graphical object, the image of which is presented in the step of presenting.

5. The computer-readable storage medium of claim 1 wherein the step of further presenting includes the step of displaying a graphic presentation based on the information element associated with the graphical object, the image of which is presented in the step of presenting.

6. The computer-readable storage medium of claim 1 wherein storage medium is a CD-ROM.

7. A computer-readable storage medium for use with a role-playing game, said storage medium configured to cause a computer to manage role-playing game information, said computer-readable storage medium including a substrate having a physical configuration that represents data including graphical object data, role playing game information data and machine instructions for directing a general purpose digital computer to perform the steps of:

providing a plurality of data packages, each data package corresponding to an element of a role-playing world, each data package representing role-playing game information;

receiving a signal from a user-operated input device, the signal corresponding to user-defined role-playing game information;

storing the user-defined role-playing game information corresponding to the signal received in said step of receiving;

further receiving an signal from the user-operated input device corresponding to an inquiry for role-playing game information; and presenting on an output device of the general purpose computer at least a portion of the user-defined role-playing game information in response to said step of receiving a user-generated inquiry signal.

8. The computer-readable storage medium of claim 7 wherein the step of presenting includes the step of displaying text describing a predetermined object.

9. The computer-readable storage medium of claim 7 wherein the step of presenting includes the step of producing an audio signal associated with a predetermined object.

10. The computer-readable storage medium of claim 7 wherein the step of presenting includes the step of displaying a graphic presentation associated with a predetermined object.

11. The computer-readable storage medium of claim 7 wherein storage medium is a CD-ROM.

12. A method for presenting information related to a role-playing game world implemented using a general purpose digital computer having a processor, a memory, an input device and an output device, the method comprising the steps of:

providing a plurality of data sets including:
a collection of first data sets, each of said first data sets defining a graphical appearance characteristic of a respectively associated graphical object corresponding to an information element of a role-playing world; and
a collection of second data sets, each of said second data sets including role playing game information data associated with the information element of the role-playing world including a respectively associated level of detail;

presenting on an output device of the general purpose computer an image of a graphical object from a selected one of the first data sets, the image being responsive to a second data set and a respectively associated first predetermined level of detail;

receiving an input signal from a user-operated input device, the input signal corresponding to the graphical object, the image of which is presented in the step of presenting;

identifying one of the second data sets associated with the graphical object corresponding to the input signal received in the step of receiving; and further presenting on the output device of the general purpose computer at least a portion of the role-playing game information identified in the step of identifying.

13. The method of claim 12 wherein the step of further presenting includes the step of presenting an image of a graphical object from a selected one of the first data sets, the image being responsive to a second data set and a respectively associated second predetermined level of detail.

14. The method of claim 12 wherein the step of further presenting includes the step of displaying text describing the information element associated with the graphical object, the image of which is presented in the step of presenting.

15. The method of claim 12 wherein the step of further presenting includes the step of producing an audio signal associated with the information element associated with the graphical object, the image of which is presented in the step of presenting.

16. The method of claim 12 wherein the step of further presenting includes the step of displaying a graphic presentation based on the information element associated with the graphical object, the image of which is presented in the step of presenting.

17. The method of claim 12 wherein the step of receiving includes the steps of:

receiving cursor control and selection information via the input device; and presenting cursor control feedback on the output device.

18. In a general purpose digital computer having a processor, a memory, an input device and an output device, a method for managing information related to a role-playing game world, the method comprising the steps of:

providing a plurality of data packages, each data package corresponding to an element of a role-playing world, each data package representing role-playing game information;

receiving a signal from a user-operated input device, the signal corresponding to user-defined role-playing game information;

storing the user-defined role-playing game information corresponding to the signal received in said step of receiving;

further receiving an signal from the user-operated input device corresponding to an inquiry for role-playing game information; and presenting on an output device of the general purpose computer at least a portion of the user-defined role-playing game information in response to said step of receiving a user-generated inquiry signal.

19. The method of claim 18 wherein the step of presenting includes the step of displaying text describing a predetermined object.

20. The method of claim 18 wherein the step of presenting includes the step of producing an audio signal associated with a predetermined object.

21. The method of claim 18 wherein the step of presenting includes the step of displaying a graphic presentation associated with a predetermined object.

* * * * *